(12) United States Patent
Horesh et al.

(10) Patent No.: US 11,514,292 B2
(45) Date of Patent: Nov. 29, 2022

(54) GRAD NEURAL NETWORKS FOR UNSTRUCTURED DATA

(71) Applicant: International Business Machines Corporation, Armonk, NY (US)

(72) Inventors: Lior Horesh, North Salem, NY (US); Raya Horesh, North Salem, NY (US); Elliot Holtham, Vancouver (CA)

(73) Assignees: International Business Machines Corporation, Armonk, NY (US); XTRACT TECHNOLOGIES INC., Vancouver (CA)

( * ) Notice: Subject to any disclaimer, the term of this patent is extended or adjusted under 35 U.S.C. 154(b) by 492 days.

(21) Appl. No.: 16/730,331

(22) Filed: Dec. 30, 2019

(65) Prior Publication Data
US 2021/0201109 A1  Jul. 1, 2021

(51) Int. Cl.
| G06N 20/00 | (2019.01) |
| G06N 3/04 | (2006.01) |
| G06F 16/31 | (2019.01) |
| G06N 3/08 | (2006.01) |

(52) U.S. Cl.
CPC ............. *G06N 3/04* (2013.01); *G06F 16/322* (2019.01); *G06N 3/08* (2013.01)

(58) Field of Classification Search
None
See application file for complete search history.

(56) References Cited

U.S. PATENT DOCUMENTS

| 9,530,071 B2 | 12/2016 | Yin et al. |
| 10,282,663 B2 | 5/2019 | Socher et al. |
| 2015/0006129 A1 | 1/2015 | An et al. |
| 2016/0117587 A1 | 4/2016 | Yan et al. |
| 2016/0224803 A1* | 8/2016 | Frank ................ G06F 21/6245 |
| 2018/0068198 A1 | 3/2018 | Savvides et al. |
| 2018/0096457 A1 | 4/2018 | Savvides et al. |
| 2018/0144509 A1 | 5/2018 | Risser |
| 2018/0247156 A1 | 8/2018 | Holtham et al. |
| 2018/0247193 A1 | 8/2018 | Holtham |

(Continued)

FOREIGN PATENT DOCUMENTS

WO  WO201852586 A1  3/2018

OTHER PUBLICATIONS

Ruthotto et al., Deep Neural Networks motivated by Partial Differential Equations, Dec. 10, 2018, 9 pages, https://arxiv.org/pdf/1804.04272v2.pdf.

(Continued)

*Primary Examiner* — Martin Mushambo
(74) *Attorney, Agent, or Firm* — Anthony Curro; Otterstedt & Kammer PLLC

(57) ABSTRACT

An illustrative embodiment includes a method for analyzing unstructured multidimensional data with a neural network. The method includes designing the neural network at least in part by defining differential operators conforming with dimensions of the data. The method also includes performing forward propagation at a given convolution layer of the neural network at least in part by: obtaining one or more convolved values at least in part by performing convolution over an object within the data, processing respective convolved values to obtain output, and updating the object based at least in part on the output.

20 Claims, 3 Drawing Sheets

(56) References Cited

U.S. PATENT DOCUMENTS

2018/0247227 A1    8/2018  Holtham
2020/0337773 A1*  10/2020  Rawlinson .............. G06T 7/194

OTHER PUBLICATIONS

Kipf et al., Semi-Supervised Classification with Graph Convolutional Networks, Feb. 22, 2017, 14 pages, https://arxiv.org/pdf/1609.02907v4.pdf.
Groh et al., Flex-Convolution—Million-Scale Point-Cloud Learning Beyond Grid-Worlds, Oct. 25, 2018, 16 pages, https://arxiv.org/pdf/1803.07289v3.pdf.
Kossaifi et al., Efficient N-Dimensional Convolutions via Higher-Order Factorization, Jun. 14, 2019, 11 pages, https://arxiv.org/pdf/1906.06196v1.pdf.

* cited by examiner

GRAD NEURAL NETWORKS FOR UNSTRUCTURED DATA

NAMES OF PARTIES TO JOINT RESEARCH AGREEMENT

The present invention was made as a result of activities undertaken within the scope of a joint research agreement between International Business Machines Corporation (IBM) and Xtract Technologies, Inc. that was in effect on or before the effective filing date of the invention.

BACKGROUND

The present invention relates to the electrical, electronic and computer arts, and, more particularly, to computational approaches for artificial intelligence (AI) applications.

Convolutional neural network (CNN) architectures have revolutionized the field of AI for segmentation, detection and classification tasks. Convolution computation often accounts for the majority of computational costs, particularly during inference during deployment. Spatial correlations are frequently local, and therefore architecture that is inspired by the notion of locality, harnessing primitives of physical processes (in the form of local differential operators), can be advantageous and much more computationally efficient.

Traditionally, convolutions must be applied on uniform grids: convolution operations operate via dimensioned stencils (3×3, 5×5, 7×7 etc.) on a regular pixelated grid either in one, two or three dimensions. However, many datasets do not come on regularly sampled grids. For example, point cloud data from sensors such as LIDAR (Light Detection and Ranging) on driverless cars and/or drones is often arranged as an irregular set of 3D (three-dimensional) points. Likewise, geospatial and/or geophysical data is often recorded on irregular grids. More generally, images and videos can often be represented more efficiently on irregular grids than on uniform grids. Thus, there is a long-felt and unmet need for predictions and classifications which could be applied directly to such data without re-gridding.

SUMMARY

An illustrative embodiment includes a method for analyzing unstructured multidimensional data with a neural network. The method includes designing the neural network at least in part by defining differential operators conforming with dimensions of the data. The method also includes performing forward propagation at a given convolution layer of the neural network at least in part by: obtaining one or more convolved values at least in part by performing convolution over an object within the data, processing respective convolved values to obtain output, and updating the object based at least in part on the output.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Illustrative embodiments of the present invention have practical applications and provide technological improvements. Illustrative embodiments enable deep neural networks to be applied to multidimensional (e.g., 3D) data volumes with substantial computational cost reduction compared to state-of-the-art algorithms. Illustrative embodiments advantageously provide an efficient and robust neural network design that harnesses differential operators and averaging maps for irregularly sampled data. For example, illustrative embodiments harness a partial differential equation (PDE) inspired framework, based upon standard convolutional neural network concepts, to handle sparse input data effectively. Thus, illustrative embodiments provide predictions and classifications without requiring data resampling and interpolation which wastes computational resources and creates undesirable artifacts. Illustrative embodiments allow differential operations to be applied to more general data representations than conventional techniques where convolutions must be applied on uniform grids. By way of example, illustrative embodiments may define differential operators on unstructured (e.g. tetrahedral) grids, thereby allowing differential operator formulations to be applied to graph and tree structures (e.g., quadtree) with connected relationships, which are common in networking applications.

These and other features and advantages of the present invention will become apparent from the following detailed description of illustrative embodiments thereof, which is to be read in connection with the accompanying drawings.

DETAILED DESCRIPTION

Figure 1:
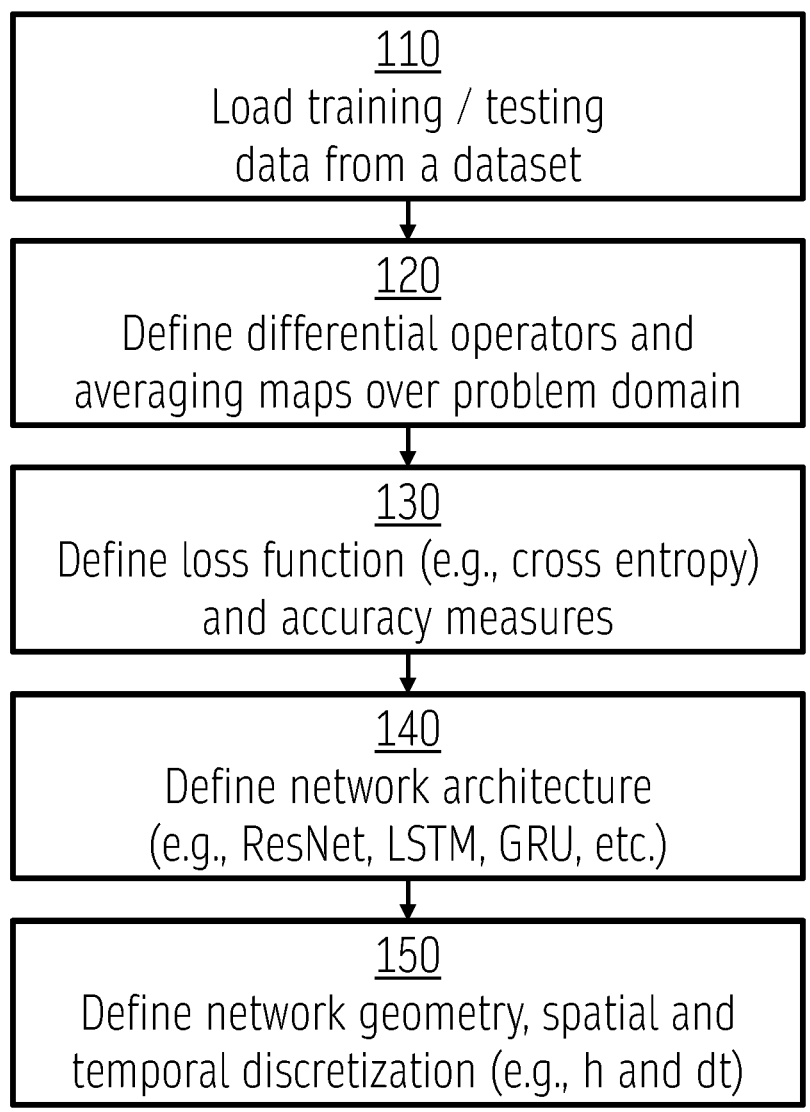
FIG. 1 is a simplified flowchart showing an exemplary technique for designing a neural network in accordance with an aspect of the invention.

FIG. 1 is a simplified flowchart showing an exemplary technique 100 for designing a neural network in accordance with an aspect of the invention. As previously discussed, illustrative embodiments advantageously provide an efficient and robust neural network design that harnesses differential operators and averaging maps for irregularly sampled data. For example, illustrative embodiments harness a partial differential equation inspired framework, based upon standard convolutional neural network concepts, to handle sparse input data effectively. In step 110, training and testing data may be loaded from a data set.

In step 120, differential operators (e.g., divergence, gradient, curl, etc.) as well as averaging mappings (e.g., cell to edge, face to node, etc.) are defined over the domain of the problem (e.g., indicated by the dataset). For a data set of two-dimensional (2D) images, these will be 2D differential operators conforming with the dimensions of the images. For higher-dimensional data, tensorial differential operators will be defined.

In step 130, the loss function (e.g., cross entropy) and accuracy measures are defined. In step 140, the network architecture is defined. The network architecture defined in step 140 may include, for example, residual network (ResNet), long short-term memory (LSTM), and/or gated recurrent unit (GRU). In step 150, the network geometry, spatial and temporal discretization are defined. Step 150 may include defining h and dt, where h is an encoder output, and dt is the decoder hidden state at time step t, which captures the previous output sequence context.

Figure 2:
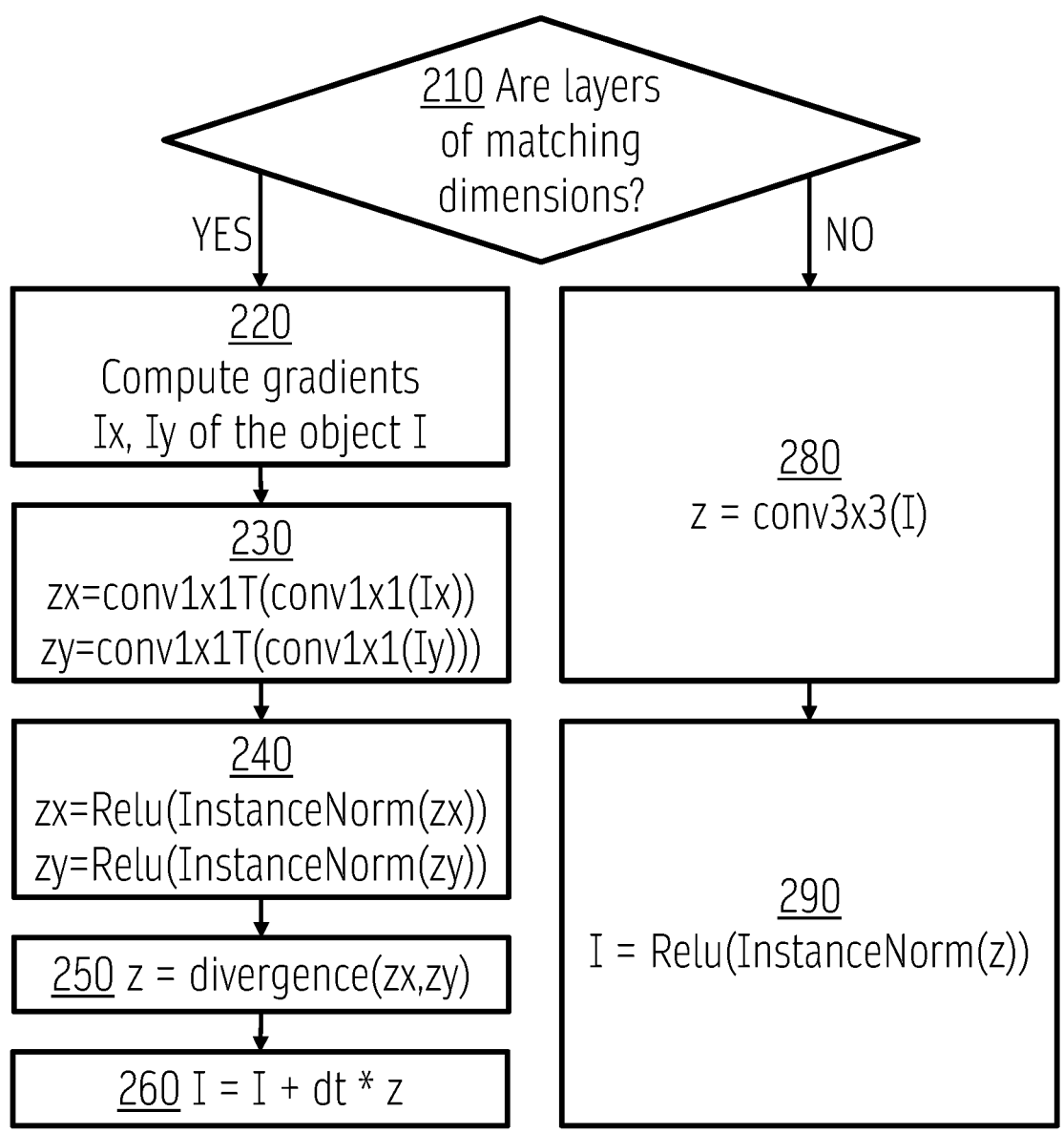
FIG. 2 is a simplified flowchart showing an exemplary technique for forward propagation in accordance with an aspect of the invention.

FIG. 2 is a simplified flowchart showing an exemplary technique 200 for forward propagation in accordance with an aspect of the invention. Technique 200 may be repeated for respective convolution layers within a neural network. Step 210 determines whether the layers are of matching dimensions. If step 210 determines the layers are of matching dimensions, then technique 200 proceeds to steps 220 through 260.

Step 220 computes network gradients (e.g., Ix, Iy) of respective dimensions of the object I. Step 230 applies tensor contraction (e.g., 1×1 convolution) of the appropriate dimension to the gradients. Thus, step 230 includes computing zx=conv1×1T (conv1×1(Ix)) and zy=conv1×1T (conv1×1(Iy)), where conv1×1 denotes a 1×1 (pointwise) convolution, and conv1×1T denotes a tensor contraction.

Step 240 performs normalization (instanceNorm) upon each convolved input (zx, zy) followed by non-linear activation function, such as a rectified linear unit (ReLU). Thus, step 240 may include computing zx=Relu(instanceNorm (zx)) and zy=Relu(instanceNorm(zy)). Step 250 involves computing divergence, e.g., z=divergence(zx,zy). Step 260 updates the object I based on the dt from step 150 and the divergence z from step 250, e.g., I=I+dt*z.

If step 210 determines that the layers do not have matching dimensions, then technique 200 proceeds to steps 280 and 290. Step 280 forms a grouped N×N convolutional layer (e.g., 3×3, 5×5, 7×7 etc.). Thus, step 280 may include computing grouped 3×3 convolution over the object I, e.g., z=conv3×3(I). Step 290 performs normalization (instanceNorm) upon each convolved input (zx, zy) followed by non-linear activation function, and then updates the object I. For example, step 290 may include computing I=Relu (instanceNorm(z)).

An illustrative embodiment of the present invention has demonstrated unexpected results. As previously discussed, conventional convolutions must be applied on uniform grids, but images can often be represented more efficiently on irregular grids. An illustrative embodiment of the present invention advantageously allows for classifications to be applied directly to such data without re-gridding, while conventional techniques require data resampling and interpolation which wastes computational resources and creates undesirable artifacts. Thus, an illustrative embodiment of the present invention enables deep neural networks to be applied to image data with substantial computational cost reduction compared to state-of-the-art algorithms.

The CIFAR10 dataset includes a total of 60,000 color images, each having a size of 32 pixels by 32 pixels. There are 6000 images in each of 10 different classes: airplanes, cars, birds, cats, deer, dogs, frogs, horses, ships, and trucks. The inventors used a basic architecture according to an illustrative embodiment of the present invention to perform image classification of the CIFAR10 dataset with over 90% accuracy.

Although the illustrative embodiments described herein primarily utilize elliptic PDE, one skilled in the art will appreciate that other differential equation architectures (e.g., parabolic or hyperbolic) may be utilized with embodiments of the present invention. For example, in an illustrative embodiment with a hyperbolic architecture, the time stepping dt discussed above with reference to steps 150 and 250 may involve a second derivative.

One or more embodiments of the invention, or elements thereof, can be implemented, at least in part, in the form of an apparatus including a memory and at least one processor that is coupled to the memory and operative to perform exemplary method steps.

Figure 3:
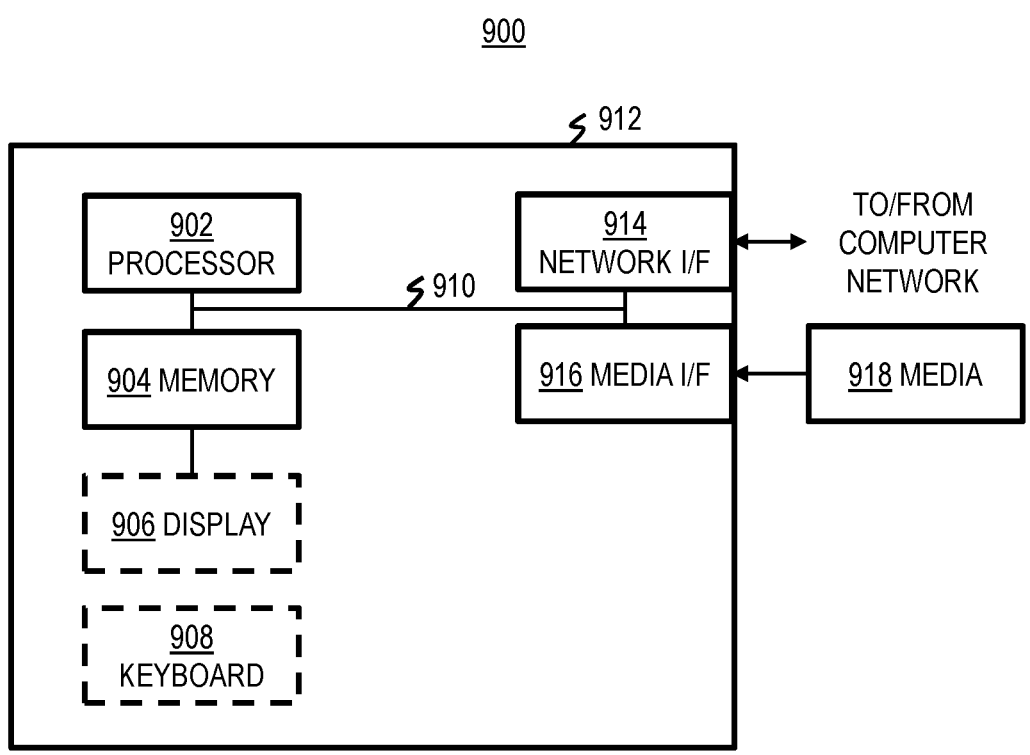
FIG. 3 shows a computer system that may be useful in implementing one or more aspects and/or elements of the invention.

One or more embodiments can make use of software running on a general purpose computer or workstation. With reference to FIG. 3, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 3) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 902. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for analyzing unstructured multidimensional data with a neural network, the method comprising:
   designing the neural network at least in part by defining differential operators conforming with dimensions of the data; and
   performing forward propagation at a given convolution layer of the neural network at least in part by:
      obtaining one or more convolved values at least in part by performing convolution over an object within the data;
      processing respective convolved values to obtain output; and
      updating the object based at least in part on the output.

2. The method of claim 1, wherein processing the respective convolved values comprises performing non-linear activation of the respective convolved values.

3. The method of claim 1, wherein processing the respective convolved values comprises normalizing the respective convolved values.

4. The method of claim 1, wherein:
   the defined differential operators comprise divergence, gradient and curl;
   obtaining a given one of the convolved values comprises performing pointwise convolution of a respective gradient computed for a corresponding one of the dimensions of the object; and
   the output comprises a divergence computed from the processed convolved gradients.

5. The method of claim 4, wherein processing the respective convolved values comprises applying tensor contraction of the corresponding dimension to the given one of the convolved values.

6. The method of claim 1, wherein at least a portion of the multidimensional data is irregularly sampled, and wherein analyzing the data comprises at least one of prediction and classification by the neural network without resampling the irregularly sampled data.

7. The method of claim 1, wherein responsive to the multidimensional data comprising more than two dimensions, defining the one or more differential operators comprises defining one or more tensorial differential operators.

8. The method of claim 7, wherein further responsive to the multidimensional data comprising more than two dimensions, processing the respective convolved values to obtain the output comprises applying tensor contraction to the respective convolved values.

9. The method of claim 1, wherein obtaining one or more convolved values comprises:
   when dimensions of the given layer match dimensions of at least another layer of the neural network, performing pointwise convolution over the object; and
   when dimensions of the given layer do not match dimensions of another layer of the neural network, performing grouped convolution over the object.

10. The method of claim 1, wherein the neural network is designed based at least in part on a partial differential equations architecture, and wherein the architecture is at least one of elliptic, parabolic and hyperbolic.

11. The method of claim 1, wherein the differential operators are defined on a tree structure.

12. The method of claim 1, wherein designing the neural network further comprises defining a time stepping, and wherein the object is updated based at least in part on the output and on the time stepping.

13. The method of claim 12, wherein the neural network is designed based at least in part on a hyperbolic architecture, and wherein the time stepping is defined using at least a second order derivative.

14. The method of claim 1, wherein designing the neural network further comprises defining one or more averaging mappings conforming with the dimensions of the data.

15. The method of claim 14, wherein the one or more averaging mappings conforming with the dimensions of the data comprise at least one of a cell to edge mapping and a face to node mapping.

16. The method of claim 1, wherein designing the neural network further comprises defining at least one of a loss function and an accuracy measure.

17. The method of claim 1, wherein designing the neural network further comprises defining at least one of network architecture and network geometry.

18. The method of claim 1, wherein designing the neural network further comprises defining at least one of spatial discretization and temporal discretization.

19. An apparatus for analyzing unstructured multidimensional data with a neural network, the method comprising:
   a memory; and
   at least one processor coupled to the memory, the processor being operative:
      to design the neural network at least in part by defining differential operators conforming with dimensions of the data; and
      to perform forward propagation at a given convolution layer of the neural network at least in part by:
         obtaining one or more convolved values at least in part by performing convolution over an object within the data;
         processing respective convolved values to obtain output; and
         updating the object based at least in part on the output.

20. A computer program product comprising a non-transitory machine-readable storage medium having machine-readable program code embodied therewith, said machine-readable program code comprising machine-readable program code configured:
   to design a neural network at least in part by defining differential operators conforming with dimensions of a set of unstructured multidimensional data; and
   to perform forward propagation at a given convolution layer of the neural network at least in part by:
      obtaining one or more convolved values at least in part by performing convolution over an object within the set of data;
      processing respective convolved values to obtain output; and
      updating the object based at least in part on the output.

* * * * *